ably received within the first and second
United States Patent [19]

Heath et al.

[11] Patent Number: 4,588,424
[45] Date of Patent: May 13, 1986

[54] FLUID PUMPING SYSTEM

[76] Inventors: Rodney T. Heath, 4901 E. Main, Farmington, N. Mex. 87401; Charles R. Gerlach, 639 W. Rhapsody, San Antonio, Tex. 78216

[21] Appl. No.: 661,398

[22] Filed: Oct. 16, 1984

[51] Int. Cl.[4] .................. B01D 53/26; F04B 17/00
[52] U.S. Cl. ................................ 55/208; 91/164; 91/226; 417/404
[58] Field of Search .................. 55/29–32, 55/208; 91/164, 224, 226, 313, 321, 342; 417/404

[56] References Cited

U.S. PATENT DOCUMENTS

| | | | |
|---|---|---|---|
| 2,990,910 | 7/1961 | Kimmell | 55/38 X |
| 3,288,448 | 11/1966 | Patterson et al. | 55/32 X |
| 3,541,763 | 11/1970 | Heath | 55/185 |
| 3,741,689 | 6/1973 | Rupp | 417/404 X |
| 4,019,838 | 4/1977 | Fluck | 417/404 X |
| 4,163,632 | 8/1979 | Hinchman et al. | 417/404 X |
| 4,198,214 | 4/1980 | Heath | 55/20 |
| 4,286,929 | 9/1981 | Heath et al. | 417/404 |
| 4,342,572 | 8/1982 | Heath | 55/174 X |
| 4,402,652 | 9/1983 | Gerlach et al. | 91/226 X |
| 4,431,433 | 2/1984 | Gerlach et al. | 55/208 X |

Primary Examiner—Robert Spitzer
Attorney, Agent, or Firm—Klaas & Law

[57] ABSTRACT

A fluid pumping system for use with a natural gas dehydrating system or the like having an absorber apparatus for removing water from wet natural gas to produce dry natural gas by use of a desiccant agent such as glycol, and a glycol treater apparatus for producing a source of dry glycol from wet glycol received from the absorber apparatus including a main body having a control bore therethrough for receiving an elongate piston shaft; an elongate main piston shaft reciprocally slideably mounted in the central bore; first and second cylinders removeably mounted on opposite sides of the main body in annular centered relationship with respect to the piston shaft; first and second main pistons mounted at opposite ends of the piston shaft and sealingly slidingly received within the first and second cylinders, each piston dividing an associated cylinder cavity into a dry glycol pumping chamber and a wet glycol driving chamber; and each dry glycol pumping chamber being operatively associated with a pumping chamber inlet in fluid communication with the treater apparatus and a pumping chamber outlet in fluid communication with the absorber apparatus; each wet glycol driving chamber being operatively associated with a first and second reversible orifice system, each reversible orifice system having an inflow operating position wherein an associated driving chamber is placed in fluid communication with wet glycol in the absorber apparatus and having an outflow operating position wherein an associated driving chamber is placed in fluid communication with the treater apparatus. Removeable piston journal members of different sizes are provided for varying a volumetric imbalance between pumping and driving chambers.

16 Claims, 9 Drawing Figures

FLUID PUMPING SYSTEM

BACKGROUND AND SUMMARY OF INVENTION

This invention relates to a fluid pumping system and, more particularly, to a fluid pumping system adapted for use with a natural gas dehydrating system of the type employed at a gas well head to remove water from a well stream composed of a mixture of gas, oil and water.

Examples of such gas dehydrating systems are disclosed in U.S. Pat. Nos. 3,094,574; 3,288,448; and 3,541,763; the disclosures of which are specifically incorporated herein by reference. In general, such systems comprise a separator means for receiving the gas-oil-water mixture from the well head and separating the oil and water liquids from "wet" (water vapor laden) gas; and a water absorber means, which employs a liquid dehydrating agent such as glycol, for removing the water vapor from the wet gas and producing "dry" gas suitable for commercial usage. The glycol is continuously supplied to the absorber means in a "dry" low water vapor pressure condition and is removed from the absorber means in a "wet" high water vapor pressure condition. The wet glycol is continuously removed from the absorber means and circulated through a treater means such as a reboiler means for removing the absorbed water from the glycol to provide a new supply of dry glycol. The glycol reboiler means usually comprises a still column associated with a gas burner for heating the wet glycol to produce hot dry glycol by removing the absorbed water and any entrained gas by vaporization. The hot dry glycol passes through a heat exchanger, where the hot glycol is cooled and the incoming wet glycol is heated, to a dry glycol storage tank. A glycol passage means is provided to enable passage of wet glycol from the absorber means to the reboiler means and to pump dry glycol from the storage tank to the absorber means. In most cases, the absorber means operates at a relatively high pressure (usually 50 psig to 2000 psig) while the reboiler means which removes the absorbed constituent from the wet glycol operates at a relatively low pressure, e.g., atmospheric pressure. The circulation rate of glycol required to achieve dehydration is a function of the natural gas flow rate, temperature and pressure. Since the dehydrating systems are continuously operated at a well site without continuous monitoring by operating personnel, reliable continuous operation of the glycol pump is of critical importance. In addition, it is highly desirable to use energy sources available at the well site for operation of the pump with maximum efficiency and minimum energy loss.

The present invention provides a new improved glycol pumping system which is operated by an available energy source other than the saleable dry natural gas at the well head; which may be operated at relatively low speeds and pressures without stalling; and which is automatically continuously operable under a wide range of operating conditions.

Prior art glycol pumping devices are described in Kimmel, U.S. Pat. No. 2,990,910; Gerlach et al., U.S. Pat. No. 4,431,433; and Gerlach et al., U.S. Pat. No. 4,402,652 which are hereby incorporated by refernece for all that is contained therein.

Each of the pumping devices described in these patents and the device of the present invention include a pump section and a motor section. The function of the pump section is to pump dry glycol from a treater or reboiler back into the absorber vessel. The function of the motor section is twofold. It provides power to drive the pump section and also meters the flow of wet glycol out of the absorber and back into the treater or reboiler.

Ideally, if there were no friction or flow pressure losses in the pumping and motor functions, the wet glycol returned from the absorber to the treater means would provide sufficient energy to power the pump which pumps dry glycol from the treater back into the absorber. In fact, ideally, the motor would have an excess of energy since the wet glycol and dissolved gas therein metered out through the pump motor is greater in volume, generally at least 3% greater, than the dry glycol pumped back into the absorber. Ideal pumping conditions cannot be achieved since significant flow losses and friction are present in an actual physical system. Prior art pumping systems have utilized well gas to increase the pumping energy of the system to make up for these friction and flow energy losses.

The device of U.S. Pat. No. 2,990,910 derives the power for the motor section entirely from the fluid metered out of the absorber and returned to the treater. The excess energy required to overcome friction, etc., is obtained by making the volumetric displacement of the motor section greater than the volumetric displacement of the pump section. The amount of volumetric imbalance is typically 25% to 50%. This imbalance requires a certain volume of natural gas to be metered out of the absorber along with the wet glycol. Generally, this gas is subsequently wasted by being vented into the atmosphere. The environmental and economic impact of this waste is considerable. For example, a gas well producing 10 million cubic feet per day from a 1100 psi well using a pump of the type described in U.S. Pat. No. 2,990,910 may waste about $25,000.00 worth of gas in one year in the pumping operation.

The pumps described in U.S. Pat. Nos. 4,431,433 and 4,402,652 require less gas comsumption than the pump of U.S. Pat. No. 2,990,910. Pumps of this type utilize a two stage motor section. The first stage is powered by wet glycol metered from the absorber by a cylinder whose volumetric displacement is about 8% greater than the pump section volumetric displacement. A reduction in imbalance is thus achieved which results in a significant reduction in gas consumption. The second stage motor section is gas powered but no significant gas waste results because the gas powering this stage is subsequently entirely directed to the burner. However, the pump devices of U.S. Pat. Nos. 4,431,433 and 4,402,652 are considerably more mechanically complex than that of the device of U.S. Pat. No. 2,990,910.

One objective of the present invention is to achieve a significant gas consumption reduction over the device of U.S. Pat. No. 2,990,910 without resorting to the complexity of the devices of U.S. Pat. Nos. 4,431,433 and 4,402,652.

Another objective of the present invention is to provide a pump/pump motor which can be easily and efficiently maintained in the field without return to a central shop area for minor overhaul work.

Another objective of the present invention is to provide a pump/pump motor in which the volumetric imbalance areas may be rapidly and easily changed to adjust for changing well or delivery conditions.

Another objective of the present invention is to provide a pump/pump motor which will reliably restart when automatically stopped and started on a well which is periodically "stop clocked".

Another objective of the present invention is to provide a pump/pump motor which, because of reduced friction and other features, will pump over a wider pressure range and run at much lower speeds without stalling, than existing units.

BRIEF DESCRIPTION OF DRAWING

The present invention is illustrated in the accompanying drawing wherein.

DETAILED DESCRIPTION

In General

Figure 1:
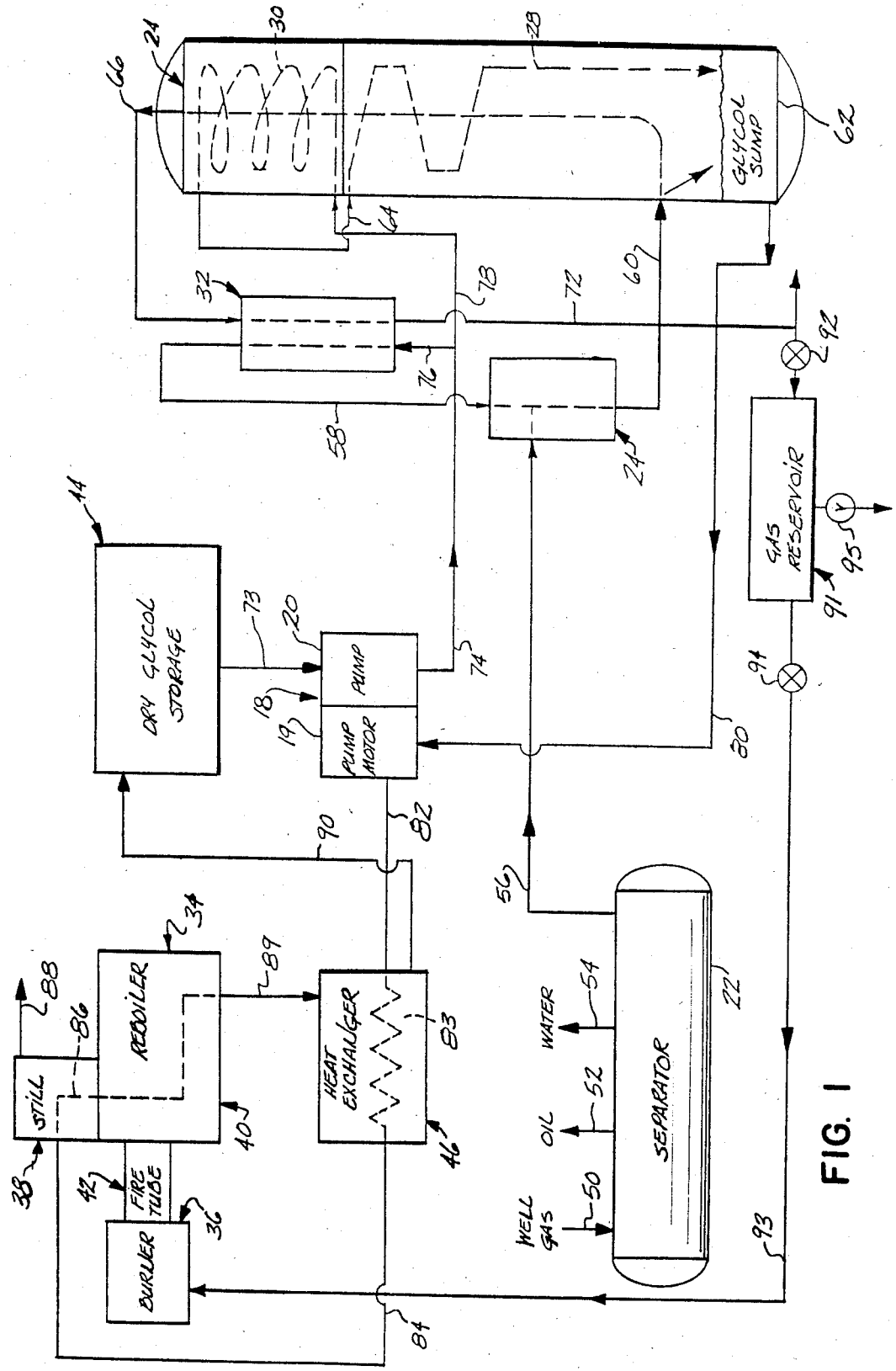
FIG. 1 is a schematic diagram of a pumping system in use in a natural gas dehydrating system.

Referring to FIG. 1, a pump/pump motor means 18 of the present invention comprises combined pump motor section 19 and pump section 20 which are shown in association with the major components of a three-phased dual-contact conventional natural gas dehydration system comprising: a gas-liquid separator means 22 for removing oil and water liquids from water vapor laden well gas; a packed glycol-gas contactor means 24 for first stage removal of water vapor from the well gas by contacting the well gas with dry glycol during concurrent downward flow thereof; an absorber means 26 for second stage removal of water vapor from the well gas, including an internal tray stack means 28 for providing a downward gravity flow of dry glycol with upward counter flow of the well gas therethrough and an internal gas-glycol heat exchanger means 30 for cooling of dry glycol prior to entry of the dry glycol into the stack tray means 28; an external gas-glycol heat exchanger means 32 for cooling the dry glycol prior to entry into the glycol-gas contactor means; a glycol treater means such as reboiler means 34 for removing water from the wet glycol, including a gas burner means 36 for heating the wet glycol, a still column means 38 for separating the water and the glycol by vaporizing the water, a tank means 40 for holding hot dry glycol, and a firetube means 42 in the tank means 40 for heating the hot dry glycol; a dry glycol storage tank means 44 for storing the dry glycol prior to return to the absorber means; and a glycol-glycol heat exchanger means 46 for cooling the hot dry glycol from the reboiler means before entry into the storage tank means while preheating the wet glycol from the absorber means before entry into the reboiler means.

In operation of the system of FIG. 1, well gas under pressure enters separator means 22 through an inlet line 50. The well gas is separated into liquid oil, water and wet gas which includes the natural gas and water vapor. Liquid oil and water are removed from the separator through outlet lines 52, 54. Wet gas under pressure is transmitted through a line 56 to the packed glycol-gas contactor means 24 whereat dry glycol from a line 58 is mixed with the wet gas. The dry glycol and wet gas flow downwardly through contactor means 24 wherein the dry glycol absorbs a portion of the water vapor. Wet glycol and partially wet gas are removed from the contactor means through a line 60 which is connected to the lower end of absorber means 26 between a wet glycol sump 62 at the bottom of the absorber means and stacked tray means 28. Wet glycol from line 60 flows downwardly into the glycol sump 62. Partially dried wet gas flows upwardly in the absorber through the stacked tray means 28 which provides a downward flow path for dry glycol received from line 64 to the glycol sump. In this manner, additional amounts of water vapor are removed from the gas which then flows upwardly through heat exchanger means 30 to an outlet line 66 and then downwardly through heat exchanger means 32 to a pipeline 72 which contains dry saleable natural gas at relative high pressure of, for example, 50 psi to 1000 psi. The dry glycol is delivered from storage means 44 to the packed gas-glycol contactor means 24 and the absorber means 26 under pressure through a pump inlet line 73, pump 20, a main pump outlet line 74, branch lines 76, 78 extending through heat exchangers 30, 32, respectively, and inlet lines 58, 64. Wet glycol is exhausted from the glycol sump 62 to pump motor 19 through a line 80 and delivered to the still column 38 of reboiler means 34 through a line 82, glycol-glycol heat exchanger means 46, and a line 84. Wet glycol flows downwardly in the still column means 38 toward reboiler tank means 40 as indicated by dashed line 86. The water in the glycol is vaporized by heat obtained from gas burner means 36 through firetube means 42 which extends into the tank means 40. Vaporized water in the form of steam is removed from the upper end of still column means 38 through an outlet line 88. Hot dry glycol is collected in tank means 40, flows downwardly through a line 89 into the top of heat exchanger means 46 containing glycol heating coil means 83. Cooled dry glycol is transmitted from the bottom of the heat exchanger tank to the upper portion of dry glycol storage means 44 through a line 90. A gas reservoir means 91 is connected to dry gas line 72 by a regulator means 92 which maintains a supply of relatively low pressure (e.g., 50–75 psig) dry gas in reservoir means 91. Burner 36 is connected to reservoir 91 by a dry gas line 93 through a regulator means 94, which reduces the pressure of dry gas to approximately 10 psi. Gas reservoir 91 has a pressure relief valve 95 to control dry gas pressure therein.

Figure 2:
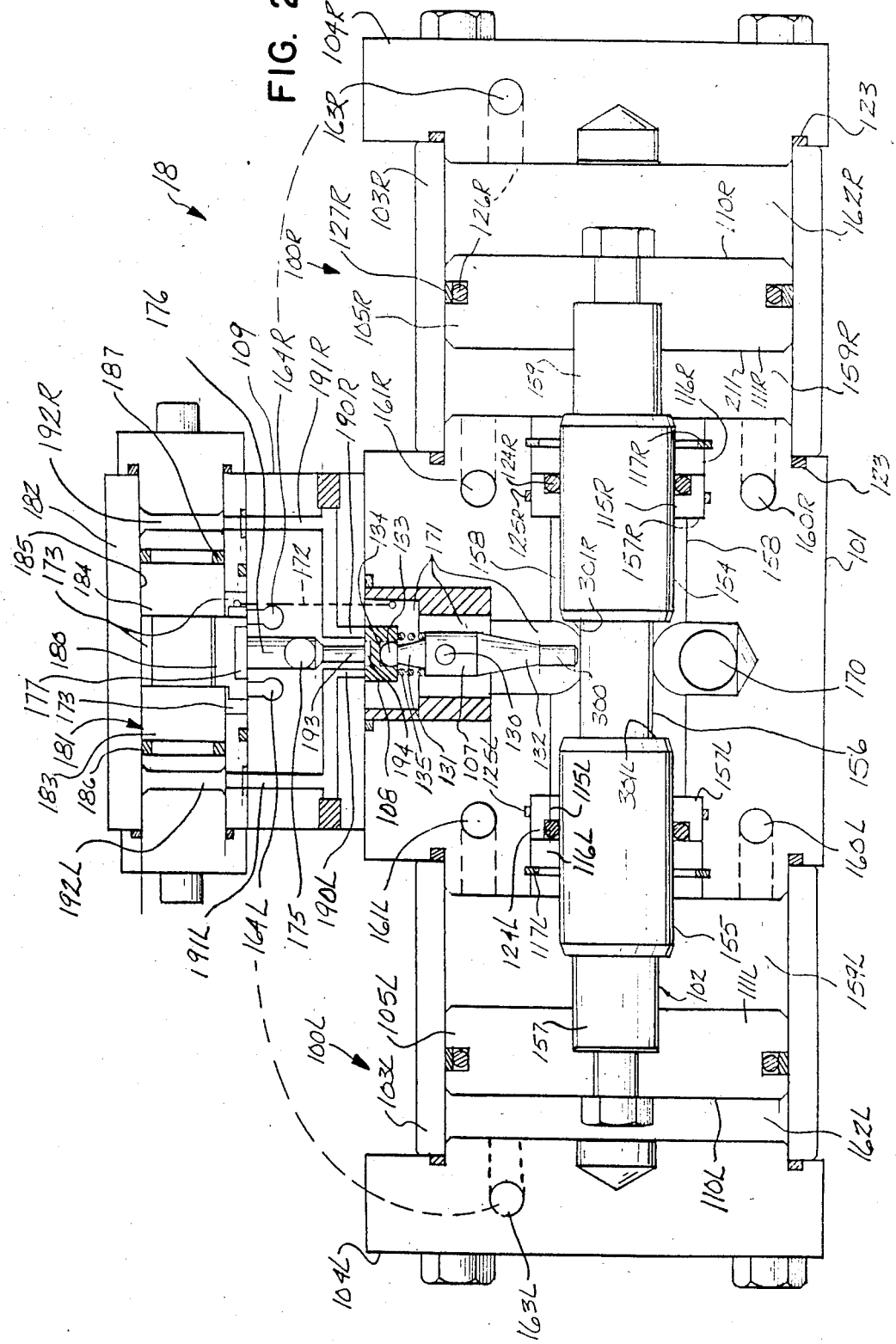
FIG. 2 is a cross sectional view of a portion of a glycol pump and pump motor assembly of the present invention.

As shown in FIG. 2, the pump/pump motor means 18 of the present invention includes two pump/pump motor sections 100L, 100R positioned opposite of each other on a central main body 101. The right pump/motor section 100R comprises a cylinder 103R which is mounted on the main body 101 and which is concentrically located about a piston shaft 102 which extends through a bore 158 in the main body 101. The right hand pump/motor section also comprises a right piston 105R which is conventionally bolted to shaft 102. A cylinder end cap 104R is bolted to the main body and axially clamps the cylinder 103R in fixed relationship with main body 101. Seal rings 123 provided in a groove in a shoulder portion of the main body 101 and in a groove in the end cap 104R form a seal at both ends of cylinder 103R to prevent leakage of fluid out of the cylinder.

The right piston 105R is free to move axially within the cylinder 103R and is slidingly sealed against the cylinder by O-ring 126R and seal ring 127R. A left piston 105L is similarly constructed and arranged with respect to a left cylinder 103L and left end cap 104L.

Figure 7:
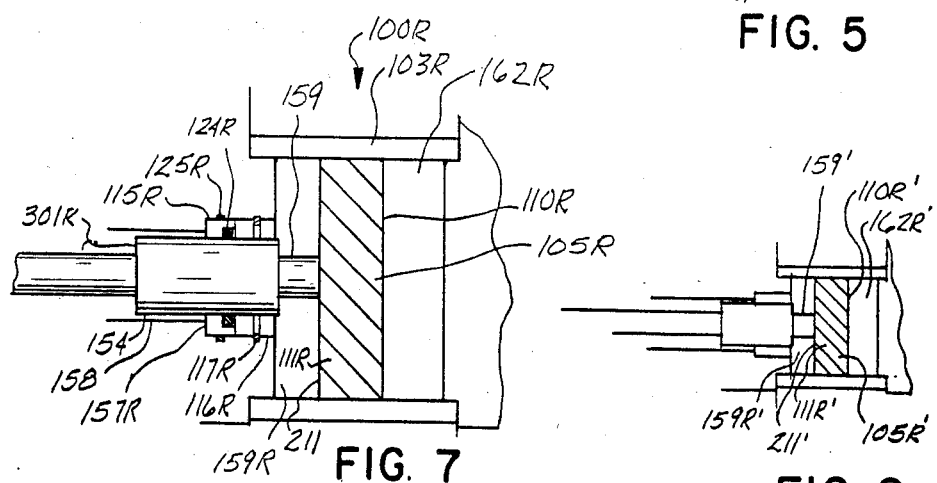
FIG. 7 is a partial cross sectional view of a pump and pump motor assembly of the present invention utilizing a relatively small journal member.
Figure 9:
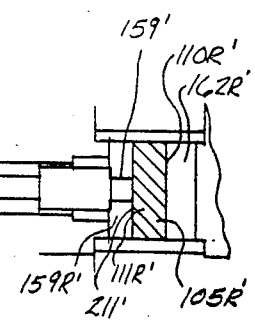
FIG. 9 is a partial cross sectional view of a pump and pump motor assembly of the present invention utilizing a piston and cylinder of relatively smaller diameter than shown in FIGS. 7 and 8.
Figure 8:
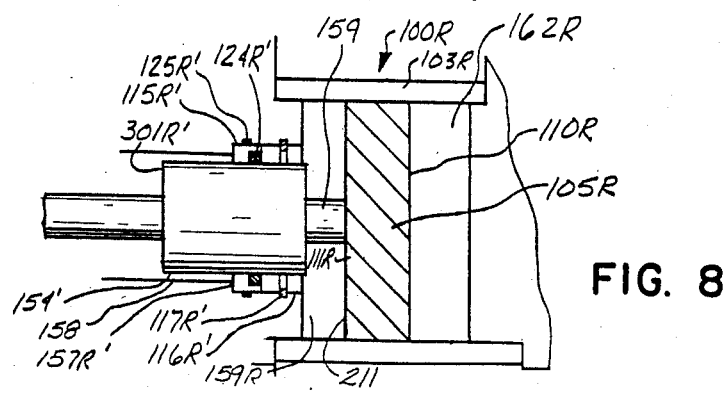
FIG. 8 is a partial cross sectional view of a pump and pump motor assembly of the present invention utilizing a relatively large journal member.

The piston shaft 102 comprises two enlarged removeably mounted journal portions 154 and 155 separated by a reduced diameter section 156 and spaced inwardly from smaller diameter end portions 157, 159 which are bolted to pistons 105L, 105R. The pushrod journal 154 is slideably sealed in the right end of the main body by a journal seal means including seal ring 124R which is housed and held in the main body 101 by seal retainer 115R and seal spacer 116R. Seal retainer 115R is in turn sealingly engaged by groove mounted seal ring 125R. Snap ring 117R holds seal retainer 115R and seal spacer 116R in place in main body 101 against the shoulder 157R of pushrod bore 158. Similarly, the pushrod journal 155 is sealed by seal ring 124L which is housed in seal retainer 115L which is engaged by seal ring 125L and is held in place against shoulder 157L by seal spacer 116L and snap ring 117L. It is a feature of the present invention that the journals and journal seal means are readily removeable and replaceable by larger or smaller diameter journals to enable the effective surface area of the inner face of an associated piston to be selectively varied, as discussed in further detail below. The use of different sized journals is illustrated in FIGS. 7 and 8 wherein a relatively small journal used in FIG. 7, and a relatively larger journal and seal (having component parts designated by reference numerals with a prime) is used in FIG. 8. Similarly, as shown in FIGS. 7 and 9, the cylinders 103L, 103R and pistons, etc. 105L, 105R may be readily replaced with small diameter units 103R', 105R' etc. (only one side shown) to reduce the pumping capacity.

Figure 5:
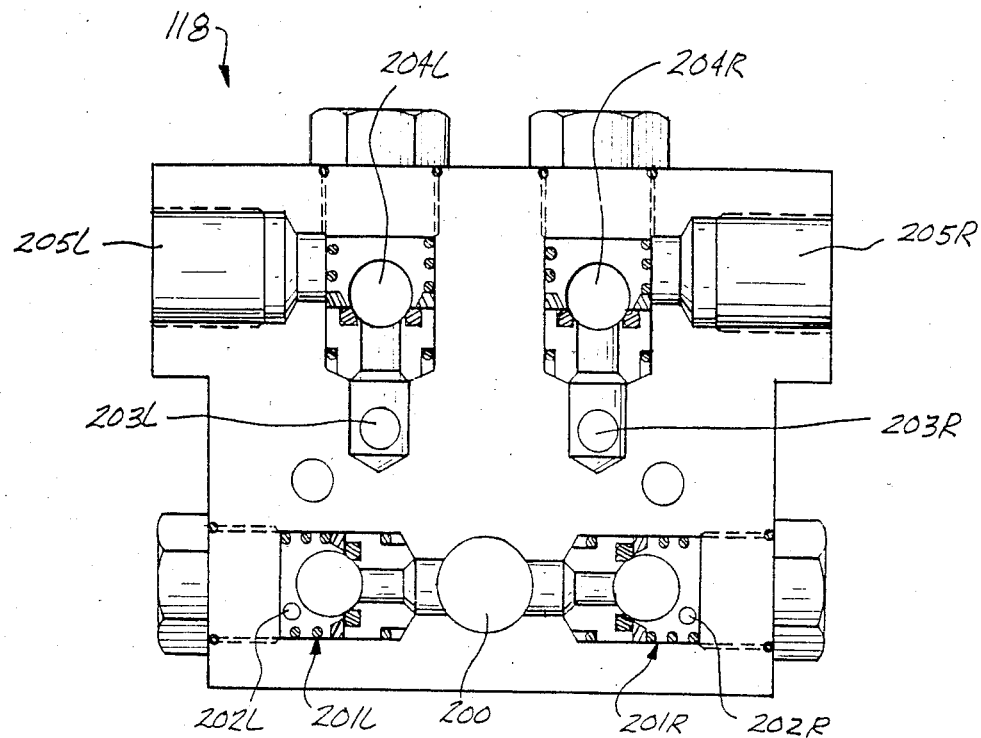
FIG. 5 is a cross sectional view of a check valve block assembly portion of the glycol pump and pump motor assembly illustrated in part in FIG. 2.

Right pump chamber 159R, defined by the portion of the cavity of cylinder 103R positioned between right piston 105R and the main body 101, alternately draws in and expels dry glycol. Fluid is drawn into chamber 159R on a suction stroke through port 160R in main body 101 which connects to port 202R of a check block assembly 118, FIG. 5. In an assembled condition the check block assembly 118 is bolted to the side of the main body 101. Port 200 of the check block assembly is the main dry glycol suction inlet. Port 200 is connected to two one way valves which in the preferred embodiment comprise conventional ball-type check valves 201L, 201R which permit flow from port 200 to the associated dry glycol chambers 159L, 159R but which does not permit a reverse flow therebetween. Dry glycol is drawn into chamber 159R through passages 160R, FIG. 2, 202R, FIG. 5 and by check valve 201R which directly communicates with port 200. This flow relationship is illustrated schematically, for the right hand cylinder 105R, in FIG. 6.

Fluid is expelled from chamber 159R on a discharge stroke through port 161R which connects to port 203R of check block assembly 118. Port 203R communicates with check valve 204R which in turn allows one way passage of fluid to outlet port 205R.

Similarly, left pump chamber 159L draws a suction charge on a suction stroke from port 200 through check valve 201L and connecting ports 202L and 160L. Left pump chamber 159L discharges fluid through connecting ports 161L and 203L through check valve 204L and outlet port 205L.

Figure 6:
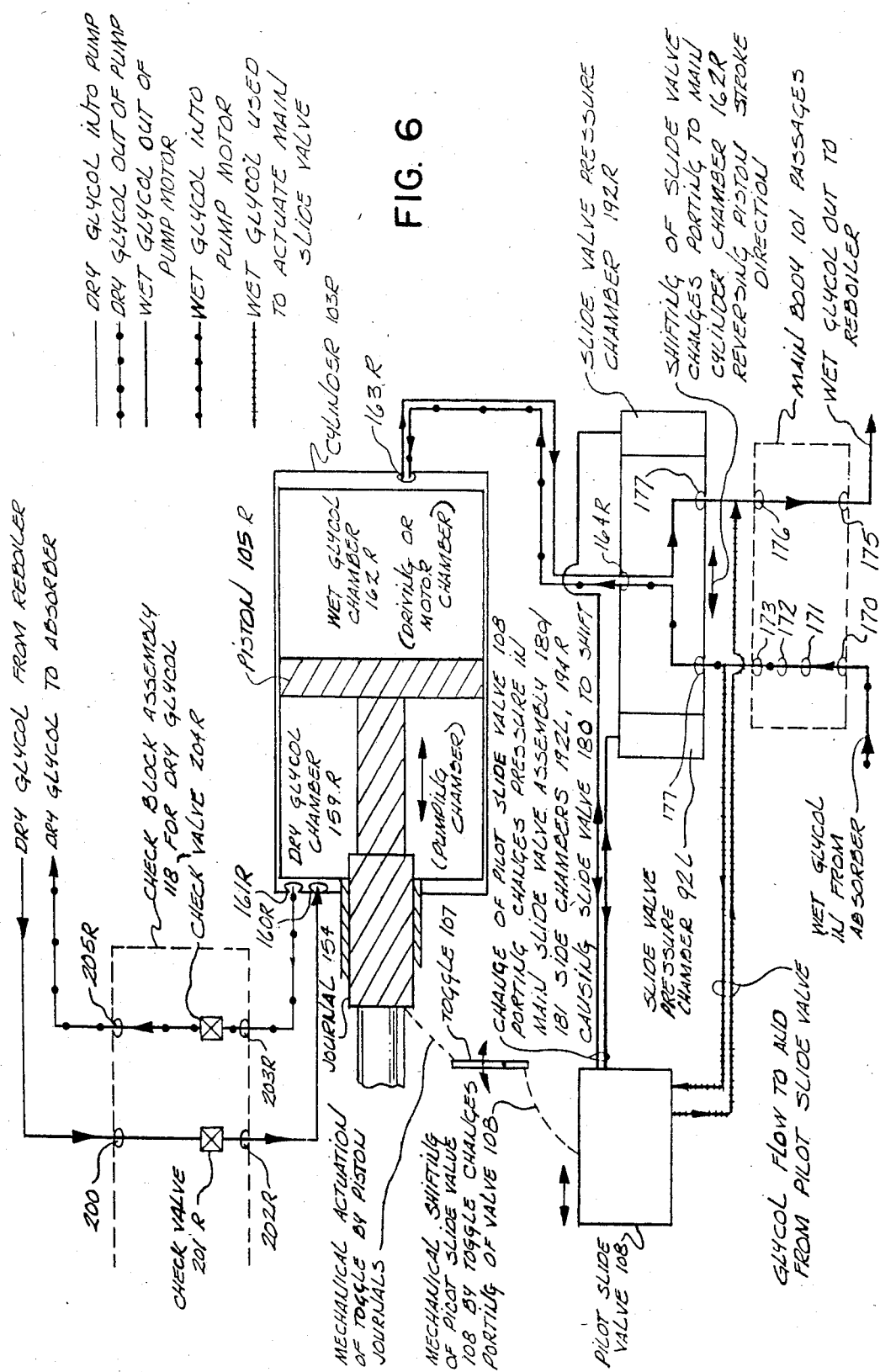
FIG. 6 is a schematic illustration of the operation of a right hand portion of the pump and pump motor assembly of FIG. 2.

Chambers 162R and 162L are motor chambers and alternately receive high pressure wet glycol from the absorber unit and discharge the wet glycol at a low pressure back to the reboiler or other treater as shown schematically in FIG. 6. Control of the wet glycol in and out of each motor chamber 162R and 162L is achieved by a reversible orifice means which may include main slide valve 180, FIG. 2. Slide valve 180 is actuated by a piston 181 sealingly slidingly mounted in slide valve cylinder 182. Piston 181 has two medially positioned, enlarged portions 183, 184 which slidingly sealingly engage the inner wall 185 of cylinder 182 as with seal rings 186, 187. Cylinder 182 and enlarged piston portions 183, 184 define variable volume chambers 192L, 192R which are alternately pressurized and depressurized to cause shifting of slide valve 180 between a left hand position and a right hand position as described in further detail below. High pressure wet glycol exerts pressure at all times on to the surfaces of slide valve 180 which define portions of cavitites 173. High pressure wet glycol enters the pump/motor unit through port 170, FIGS. 2 and 6, and then communicates with cavity 173 through passages 171 and 172. If the piston 181 and slide valve 180 is shifted to the left from the neutral position shown in FIG. 2, to the position in FIG. 3, then high pressure wet glycol from port 170 communicates with wet glycol chamber 162R through passages 171 and 172, cavity 173, and connecting passages 164R and 163R.

Port 175, FIG. 2, is the low pressure wet glycol outlet to the reboiler. Port 175 communicates through passage 176 with lower cavity 177 of slide valve 180. With the piston 181 and slide valve 180 shifted to the right, as shown in FIG. 4, and as shown by nondotted flow lines in FIG. 6, the right motor chamber 162L is placed in communication with wet glycol outlet port 175 through communicating ports 163R and 164R, slide valve cavity 177, and passage 176. Thus, wet glycol is discharged from right motor chamber 162R when slide valve 180 is shifted to the right. Wet glycol is similarly discharged from the left motor chamber 162R when the slide valve 180 is shifted to the left, FIG. 3.

In summary, with the slide valve 180 and actuator piston 181 shifted to the left, high pressure, wet glycol from the absorber is ported to motor chamber 162R and low pressure, wet glycol is exhausted from motor chamber 162L to the reboiler. Similarly, if the actuator piston 181 and slide valve 180 are shifted to the right, as shown in FIG. 4, then high pressure wet glycol is ported to motor chamber 162L and low pressure wet glycol is exhausted from chamber 162R.

The structure and operation of the mechanism used to change the position of slide valve 180 to produce reciprocal motion in the pump/motor will now be described with reference to FIGS. 2, 3, 4 and 6.

Figure 3:
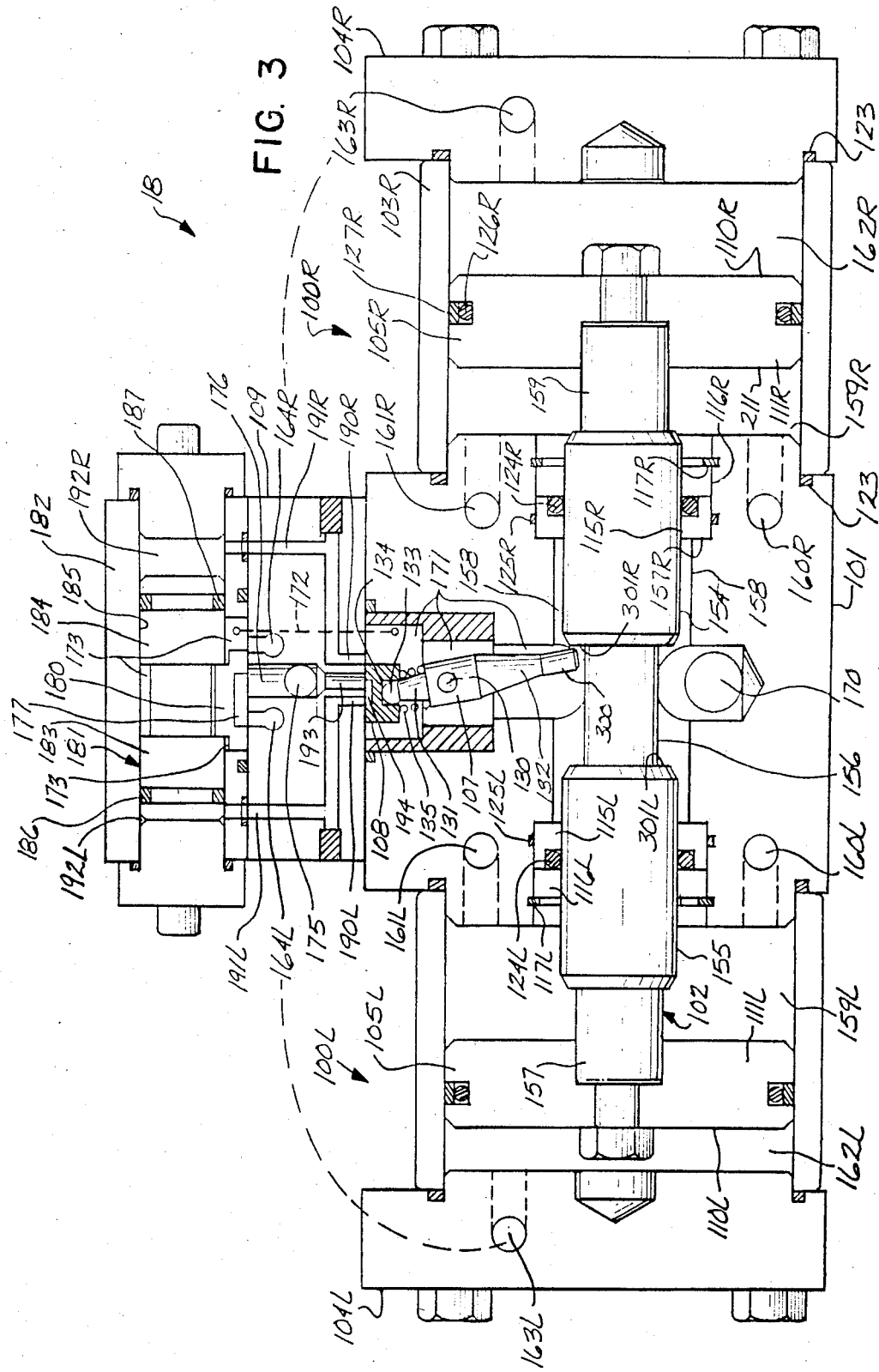
FIG. 3 is a cross sectional view of the portion of the pump and pump motor assembly of FIG. 2 showing a slide valve in a leftwardly shifted position.
Figure 4:
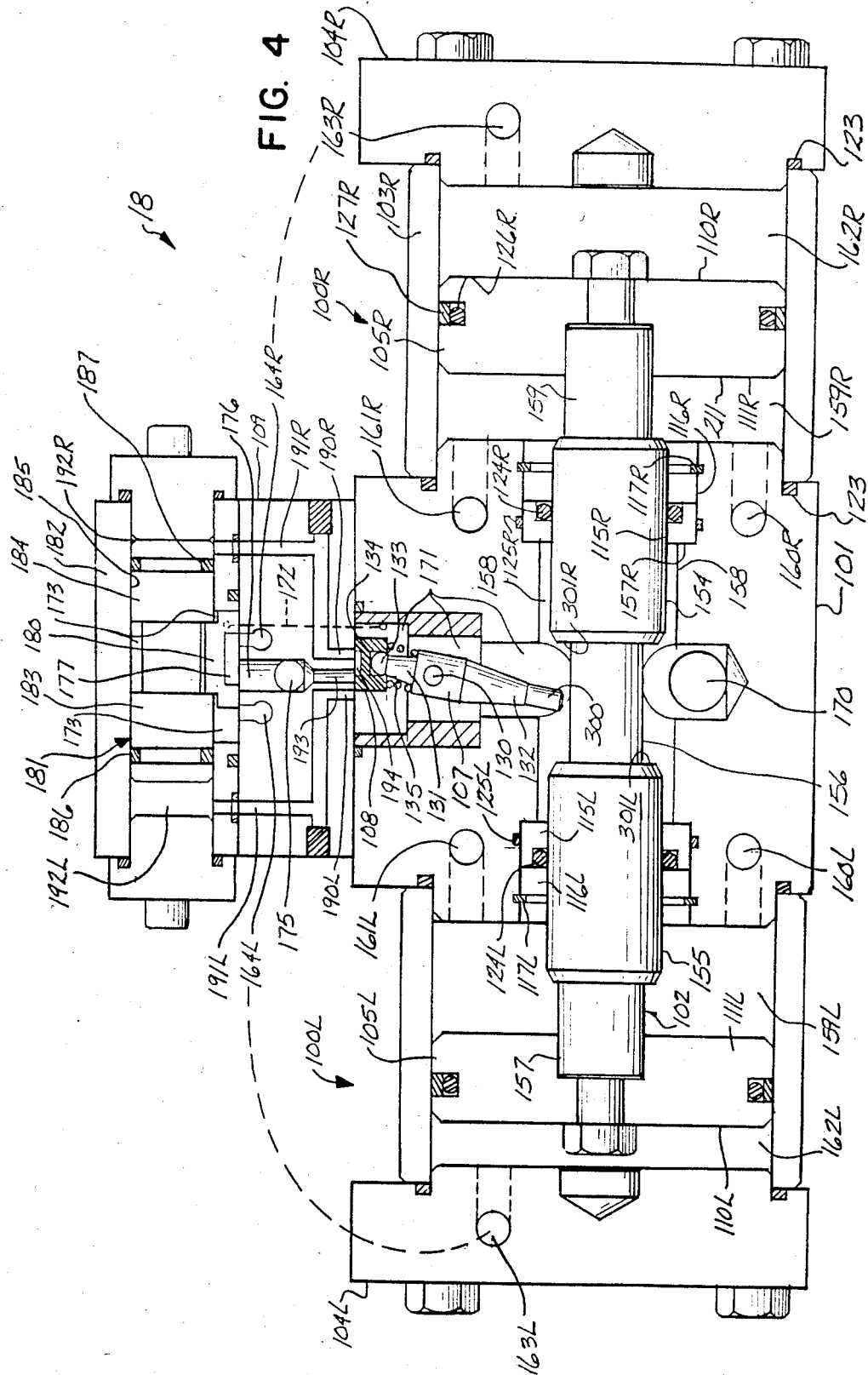
FIG. 4 is a cross sectional view of the portion of the pump and pump motor assembly of FIG. 2 showing a slide valve in a rightwardly shifted position.

As shown in FIGS. 2, 3, and 4, a toggle 107 is pivotally mounted about a pivot axis as by pin 130 in cavity 171 which opens at the lower portion thereof into central body bore 158. The toggle is mounted such that the length of the lever arm 131 formed above the pivot axis is substantially shorter and preferably half or less the length of the lever arm 132 formed below the toggle pivot axis. The upper end portion of the toggle terminates in a ball portion 133 which is swivally mounted in an open socket portion 134 of pilot slide valve 108. Pilot slide valve 108 is biased into planar, slideable, abutting relationship with an upper planar face of cavity 171 with biasing spring 135. Spring 135 is engaged at its lower end with a shoulder portion of toggle 107. Thus rightward shifting of the lower arm 132 of the toggle causes pilot slide valve 108 to slide to the left, as shown in FIG. 3, and leftward shifting of the toggle lower arm 132 causes rightward shifting of pilot slide valve 108 as illustrated in FIG. 4. Applicant has discovered that due to engineering constraints relating to fluid dynamics, etc. the cross-sectional dimensions of lines 190L and 190R cannot be reduced below a diameter of about 0.080 inches, with a separation of about 0.3 inches, and consequently the surface contact area and shifting distance of slide valve 108 cannot be reduced beyond predetermined values that are dependent on the diameters and separation of lines 190L and 190R. As a result of these constraints, the friction generated by movement of the slide valve 108 cannot be reduced beyond a predetermined value, which is dependent on the diameter of lines 190L and 190R, without resorting to the use of exotic and expensive materials which may be unsuitable for use in this environment. Applicant has also discovered that friction caused by movement of slide valve 108 is a primary cause of pump stalling at low operating speeds.

By having the length of lever arm 132 greater than the length of lever arm 131, the force required on tong 300 to shift the lower toggle arm 132 to the right or to the left is reduced. This significantly reduces the total pump friction during shifting which is a primary cause of pump stalling and permits the present device to operate reliably at lower pressures and over a wider pressure range than the device of U.S. Pat. No. 2,990,910 and other prior art pumping units.

This mechanical advantage of the toggle also helps assure reliable restarts when the pump is automatically stopped and started during periodic well "stop clocking". Applicant has discovered that providing a mechanical advantage of at least two to one reduces pump friction sufficiently to allow reliable operation of the unit at pump speeds on the order of 2 or 3 strokes per minute whereas prior art pumping units have generally encountered stalling at any pumping speeds below 10 strokes per minute.

In FIG. 2, the actuator piston 181, the slide valve 180, toggle 107 and pilot slide valve 108 are shown in a centered position. In normal pump operation, the centered position of these components is passed through as the components shift, but the components never stop in this position. FIG. 3 shows a normal shifted operational position of the pump. The toggle 107 is tilted so that the pilot slide valve 108 is shifted to the left. This permits high pressure, wet glycol from passage 171 to communicate through port 190R and passage 191R to pressure chamber 192R of main slide valve cylinder 182. Similarly, with the toggle and pilot slide valve shifted as shown in FIG. 3, low pressure wet glycol in port 175 communicates through port 193 and cavity 194, then through port 191L to pressure chamber 192L allowing exhaust of wet glycol therefrom. Since there is high pressure in chamber 192R on the right side of and low pressure on the left side of main slide valve piston 181, it is shifted to the left as shown in FIG. 3.

With the toggle 107 and pilot slide valve 108, and the actuator piston 181 and main slide valve 180 shifted as shown in FIG. 3, high pressure wet glycol is directed, as indicated previously, to motor chamber 162R and motor chamber 162L is connected to the low pressure wet glycol port 175. In this condition, the piston assembly 102, 105R, 105L, etc. moves to the left pumping dry glycol from chamber 159R through passages 161R and 203R, out through check valve 204R and then through passage 205R to the absorber unit. At the same time, low pressure dry glycol is drawn into pumping chamber 159L from suction port 200 through check valve 201L and through passages 202L and 160L.

Referring to FIG. 3, the wet glycol shifting means for producing stroke reversal in the unit will now be described. For the condition shown in FIG. 3, the toggle 107 is tilted slightly counterclockwise from a true vertical position. The pilot slide valve 108 is thereby shifted to the left causing, as described previously, high pressure wet glycol to force the actuator piston 181 to the left as shown. This results in high pressure wet glycol being ported to motor chamber 162R and low pressure wet glycol ported from motor chamber 162L. With the piston shaft 102 and pistons now moving to the left, contact is eventually made between the tang 300 at the lower end of the toggle 107 and the inward end 301R of piston shaft journal 154. The toggle is subsequently caused to pivot clockwise by further motion of the pushrod 102 until the pilot slide valve 108 is moved to a new position as shown in FIG. 4. When pilot valve 108 occupies the position shown in FIG. 4, high pressure wet glycol is ported to chamber 192L at the left side of the actuator piston 181 and chamber 192R at the right side of actuator piston 181 is ported to the low pressure wet glycol port 175. The actuator piston 181 and slide valve 180 are thereby shifted to the right from the position of FIG. 3 to the new position shown in FIG. 4. This results in motor chambers 162L and 162R being placed in communication with high pressure wet glycol and low pressure wet glycol, respectively. Similarly, chambers 159L and 159R are ported, respectively, to dry glycol suction and to the high pressure dry glycol inlet of the absorber.

The above-described motor/pump operating features are summarized schematically in FIG. 6 wherein the dotted lines illustrate an operating condition in which piston 105R is moving to the left, and in which the nondotted lines illustrate an operating condition in which piston 105R is moving to the right. It will, of course, be understood that a glycol flow opposite to that taking place in the right cylinder 103R will be taking place simultaneously in the left cylinder 103L.

Normally, the high pressure wet glycol which fills chamber 162R to drive piston 105R and the high pressure dry glycol pumped from chamber 159R are not at exactly the same pressure. Generally, the dry pumped glycol in chamber 159R is at a somewhat higher pressure because of fluid flow line losses and pump friction. Since there is an imbalance of pressures across piston 105R, the greater fluid pressure in chamber 159R must be compensated by using a smaller effective area on the left face of piston 105R than the effective area used on the right face of piston 105R.

It may be seen from FIG. 2 that each piston 105R, 105L has an outwardly directed face 110R, 110L exposed to wet glycol in an interfacing motor chamber 162R, 162L. Each piston also has an oppositely positioned face 111R, 111L exposed to dry glycol in an interfacing pumping chamber 159R, 159L. In the right pump/motor section 100R, the effective piston 105R face 110R area which is exposed to pressure from the fluid in wet glycol (motor) chamber 162R is the full face area of the piston 105R, i.e., the full cross sectional area of chamber 162R. However, the effective area of piston 105R face 111R which is exposed to pressure from the fluid in dry glycol (pump) chamber 159R is equal to the full face area of the piston 105R less the cross sectional area of the piston shaft journal portion 154. Such a difference in effective piston face areas on opposite sides of each piston provides a force imbalance sufficient to overcome friction and flow energy losses to allow pumping of dry glycol to the absorber as explained below.

The wet glycol pressure differential $\Delta P_w$ available to power the pump is given by:

$$\Delta P_w = P_a - \Delta P_{head\ w} - \Delta P_{w\ flow\ loss}$$

where $\Delta P_w$ = net wet glycol pressure differential available to power pump motor $P_a$ = absorber pressure $\Delta P_{head\ w}$ = head pressure difference between the pump motor inlet line 80 at the absorber and the motor outlet discharge line 80 at the still column.

$\Delta P_{w\ flow\ loss}$ = wet glycol system total flow loss through lines 80, 82, 83 and 84 and pump motor 19.

The dry glycol pressure differential required of the pump is given by:

$$\Delta P_d = a + \Delta P_{head\ d} + \Delta P_{d\ flow\ loss}$$

where $\Delta P_d$ = net dry glycol pressure differential required of the pump.

$\Delta P_{head\ d}$ = head pressure difference between the dry glycol storage tank 44 and the uppermost dry glycol head location of absorber unit 26.

$\Delta P_{d\ flow\ loss}$ = dry glycol system total flow loss through lines 73, 74, etc. and pump 20.

In general, $\Delta P_d$ is always greater than $\Delta P_w$ and this difference increases as the pump speed increases.

The wet glycol pressure differential $\Delta P_w$ acts across the piston faces 110L, 110R with areas $A_w$ and the dry glycol pressure differential $\Delta P_d$ acts across the piston faces 111L, 111R with area $A_d$. The net force acting on the rod 102, piston 105L, 105R assembly may now be written as:

$$F\ net = \Delta P_w \times A_w - \Delta P_d \times A_d - F_F$$

where $F_F$ is the force of friction caused by the seals 124L, 124R, 127L, 127R and by the periodic engagement of the toggle tang 300. In order to have piston motion Fnet must be greater than zero. Since $\Delta P_d$ is always greater than $\Delta P_w$, $A_w$ must be greater than $A_d$ to allow pump operation. Therefore the force differential which is produced by this difference in effective areas between opposite sides of a piston must be sufficiently large to overcome the frictional losses and flow losses within the system; otherwise no piston movement will take place. On the other hand, if the force differential is too great the piston will be accelerated and decelerated radidly, thus the unit may pump too rapidly and may damage itself or associated equipment and will use excessive gas.

Providing too great a force differential between opposite sides of a piston may also create another problem as will now be explained. Due to the difference in volumes between the wet glycol (motor or driving) chamber 162R and the dry glycol (pumping) chamber 159R caused by the different effective piston areas, a considerably larger volume of wet glycol is metered through the pump/motor unit than the volume of dry glycol that is being pumped. As explained above, the volume of wet glycol and entrained gas therein is usually significantly greater than the volume of dry glycol because of the water etc. contained in the wet glycol. However, if the friction and flow losses of the system require a relatively large force differential between sides of the piston, the resulting volume differential between the wet glycol and dry glycol chambers may cause the pump to draw more driving fluid from the wet glycol sump than can be made up from wet glycol (and entrained gas) alone. In this event, the pump begins to use well gas as a portion of the driving fluid. Such a result should be avoided to the extent possible since all well gas used in this manner reduced the amount of available sale gas and thus decreased the well yield.

Thus it is generally desirable to provide a pumping system having minimal friction such that the central force differential is fairly low. It is also desirable to provide the necessary force differential while providing a minimal difference in effective volumes between the dry glycol chambers 159L, 159R and wet glycol chambers 162L, 162R. Applicant has discovered that the pump/motor construction described above tends to reduce friction losses because of the relatively small number of moving parts. Applicant has also discovered that a force differential can be produced most efficiently (i.e. with relatively little friction and relatively small volumetric differences between wet and dry glycol chambers) by providing relatively large diameter pistons, e.g., 2 inches to 4 inches with relatively small stroke lengths, e.g., 0.75 inches to 1.1 inches and relatively small journal diameters, e.g., 0.75 inches to 1.2 inches. It has been found that for any given pump cylinder volume a minimum ratio between piston diameter and piston stroke length of 2:1 is desirable and preferably 3:1. It has also been found that the piston diameter should always be substantially greater than the journal diameter: a ratio of at least 1.75:1 and preferably greater than 3:1.

Applicant's unique pump construction also allows the pressure differential between sides of a piston to be easily adjusted in the field such that the pump operates at a speed commensurate with the pressure and temperature requirements at the well head. Adjustment is achieved by providing a plurality of journals 154, 155 having different outer diameters and with a plurality of cylinders 103L, 103R and pistons 105L, 105R having different internal diameters. A pair of journals, each having the same diameter, are inserted in place of an existing journal pair to vary the pumping speed of the pump/motor unit. A larger pair of journals, e.g. FIG. 8, causes a greater force differential between sides of the piston and thus causes faster pumping and increased glycol circulation or operation to lower pressure. A smaller pair of journals, e.g. FIG. 7, reduces pumping speed or increases lower operation pressure and also reduces somewhat the ratio of wet glycol to dry glycol required for pump operation.

Journal replaceability is provided by the use of a relatively large central body bore diameter 158 with respect to push rod 102 diameter, e.g., 2:1. Journal seal assemblies 115, 116, 177, 124, 125 are, of course, provided with a plurality of different internal diameter configurations to accommodate various journal diameters.

The fine adjustment to operational speed of the pump is preferably controlled by restricting the wet glycol flow in lines 164L and 164R, by use of a conventional flow control device such as a needle valve (not shown). As explained above, the coarse adjustment of pump speed for a given operating condition, i.e., the maximum pump speed limit, is provided by selection of cylinder bore diameter to journal diameter ratio.

It is contemplated that the inventive concepts herein described may be variously otherwise embodied and it is intended that the appended claims be construed to include alternative embodiments of the invention except insofar as limited by the prior art.

What is claimed is:

1. A fluid pumping system for use with a natural gas dehydrating system or the like having an absorber apparatus for removing water from wet natural gas to produce dry natural gas by use of a desiccant agent such as glycol, and a glycol treater apparatus for producing a source of dry glycol from wet glycol received from the absorber apparatus comprising:

(a) main body means having a central bore therethrough for receiving elongate piston shaft means therethrough;

(b) elongate main piston shaft means reciprocally slideably mounted in said main body means central bore;

(c) first and second cylinder means removeably mounted on opposite sides of said main body means in annular centered relationship with respect to said piston shaft means, said first and second cylinder means defining, respectively, a first and second cylindrical cavity;

(d) first and second main piston means mounted at opposite ends of said piston shaft means and sealingly slidingly received within said first and second cylinder means, respectively, each said piston means dividing each associated cylinder means cavity into a pumping chamber for receiving low pressure dry glycol from the glycol treater apparatus and for pumpingly exhausting high pressure dry glycol to the absorber apparatus, and a driving chamber for drivingly receiving high pressure wet glycol from the absorber apparatus and discharging low pressure wet glycol to the treater apparatus, whereby a first and second dry glycol pumping chamber and a first and second wet glycol driving chamber are provided;

(e) each said first and second dry glycol pumping chamber being operatively associated, respectively, with a first and second pumping chamber inlet means in fluid communication with the treater apparatus for allowing an inflow of low pressure dry glycol, and being operatively associated, respectively, with a first and second pumping chamber outlet means in fluid communication with the absorber apparatus for allowing a discharge of high pressure dry glycol to the absorber apparatus;

(f) each said first and second wet glycol driving chamber being operatively associated with a first and second reversible orifice means, respectively, each reversible orifice means having an inflow operating position wherein an associated driving chamber is placed in fluid communication with wet glycol in said absorber apparatus for providing an inflow of wet glycol to said driving chamber and having an outflow operating position wherein an associated driving chamber is placed in fluid communication with the treater apparatus for allowing an exhaust of wet glycol from said driving chamber, the operating positions of said first and second reversible orifice means being in opposite phase with one another whereby when one driving chamber is receiving a wet glycol inflow, the other driving chamber is discharging wet glycol whereby said piston means and said piston shaft means are driven back and forth in a reciprocating motion by inflow of wet glycol into alternating ones of said first and second driving chambers.

2. The invention of claim 1 wherein each said main piston means comprises an inwardly directed face interfacing with fluid in an associated pumping chamber, and an outwardly directed face interfacing with fluid in an associated driving chamber wherein the effective force transmitting area of said inwardly directed face is less than the effective force transmitting area of said outwardly directed face.

3. The invention of claim 2, said main piston shaft means comprising a relatively small diameter central main shaft and a pair of relatively larger diameter journal members attached to said main shaft at medial portions thereof; and further comprising journal member annular seal means operably removeably mounted in said main body means central bore for slidably receiving said journal members therewithin and for sealing off said central bore at opposite longitudinal ends thereof; said journal member being positioned axially opposite said inwardly directed piston face and being moveable with said piston means whereby the effective force transmitting surface area of said inwardly directed piston face is equal to the actual cross sectional area of said face less the cross sectional area of said journal member whereby the effective force transmitting area of said inwardly directed face is adjustably variable by replaceable use of different sized journal members and journal seals.

4. The invention of claim 3 wherein said piston means are variably displaceable within said cylinder means between two axially most remote positions defining a piston stroke length and wherein the ratio of said piston means diameter to said piston stroke length is at least 2 to 1.

5. The invention of claim 3 or 4 wherein the ratio of said piston cross sectional area to said journal member cross sectional area is at least 3 to 1.

6. The invention of claim 1, said pumping chamber inlet means comprising an inlet check valve means for allowing fluid flow into said pumping chamber through said inlet means and for preventing flow out of said pumping chamber through said inlet means, said pumping chamber outlet means comprising an outlet check valve means for permitting fluid flow out of said pumping chamber through said outlet means and for preventing fluid flow into said pumping chamber through said outlet means.

7. The invention of claim 1, each said reversible orifice means comprising:
(a) a wet glycol inlet fluid passage in fluid communication with said wet glycol in the absorber apparatus,
(b) a wet glycol outlet fluid passage in fluid communication with said wet glycol in the treater apparatus,
(c) a driving chamber fluid passage for allowing inflow or outflow of wet glycol therefrom, and
(d) main slide valve means slideable between an inflow position associated with said reversible orifice means inflow operating position wherein said wet glycol inlet fluid passage is placed in fluid communication with said driving chamber fluid passgae, and an outflow position associated with said reversible orifice means outflow operating position wherein said wet glycol outlet fluid passage is placed in fluid communication with said driving chamber fluid passage.

8. The invention of claim 3, said main slide valve means comprising:
(a) a slide valve body for changing the relative porting between the driving chamber fluid passage and said wet glycol inlet and outlet fluid passages, and
(b) a shifting assembly comprising a main slide valve piston shaft fixedly mounted at medial portions thereof with a first and second piston head said first piston head bearing on one lateral side of said slide valve body said second piston head bearing on the opposite lateral side of said slide valve body, said piston heads being slideably received within a slide valve cylinder and defining a first and second pressure chamber between respective outboard faces of each said piston head and terminal end portions of said slide valve cylinder.

9. The invention of claim 8, said main slide valve shifting assembly further comprising main slide valve actuation means including:
(a) a first pilot line for alternately connecting said first pressure chamber to a high pressure wet glycol source and low pressure wet glycol source and
(b) a second pilot line for alternately connecting said second pressure chamber to high pressure wet glycol source and low pressure wet glycol source,
(c) said first and second pilot lines being alternately, oppositely ported to a high pressure wet glycol source and a low pressure wet glycol source respectively by a pilot slide valve whereby when one of said first and second pressure chambers is connected to said high pressure wet glycol source, the other pressure chamber is connected to said low pressure wet glycol source, whereby a pressure differential is created between said pressure chambers producing relative shifting of said first and second slide valve piston heads and said main slide valve body thereby effecting shifting of said slide valve means between said first and second slide valve operation positions;
(d) said pilot valve being relatively shiftable between a first and second operation position associated with said pilot line opposite porting configurations by displacement of a pivotal toggle having a first arm portion swivally connected to said pilot valve and having a second arm portion operatively engageable and deflectable by opposite medially positioned engagement portions on said elongate piston shaft when said piston shaft is at a relative position associated with an end portion of a piston stroke.

10. The invention of claim 9, the ratio of the length of said toggle second arm portion to said first arm portion being at least 2 to 1.

11. A fluid pumping system for use with a natural gas dehydrating system or the like having an absorber apparatus for removing water from wet natural gas to produce dry natural gas by use of a desiccant agent such as glycol, and a glycol treater apparatus for producing a source of dry glycol from wet glycol received from the absorber apparatus comprising:
(a) main body means having a control bore therethrough for receiving elongate piston shaft means therethrough;
(b) elongate main piston shaft means reciprocally slideably mounted in said main body means central bore, said main piston shaft means comprising a relatively small diameter central main shaft and a pair of relatively larger diameter journal members attached to said main shaft at medial portions thereof;
(c) journal member annular seal means operably removeably mounted in said main body means central bore for slidably receiving said journal members therewithin and for sealing off said central bore at opposite longitudinal ends thereof;
(d) first and second cylinder means removeably mounted on opposite sides of said main body means in annular centered relationship with respect to said piston shaft means, said first and second cylinder means defining, respectively, a first and second cylindrical cavity, of substantially identical dimensions, each said cylindrical cavity terminating, at an inboard end, at said main body means and, at an outboard end, at a first and second end cap, respectively, the diameter to length ratio of each said cylindrical cavity being at least 2 to 1;
(e) first and second main piston means removeably mounted at opposite ends of said piston shaft means and sealingly slidingly received within said first and second cylinder means, respectively, each said piston means dividing each associated cylinder means cavity into a pumping chamber for receiving low pressure dry glycol from the glycol treater apparatus and for pumpingly exhausting high pressure dry glycol to the absorber apparatus, and a driving chamber for drivingly receiving high pressure wet glycol from the absorber apparatus and discharging low pressure wet glycol to the treater apparatus; said pumping chamber of each cylinder means being positioned inboard of said driving chamber whereby the inwardly directed face of each of said first and second piston means is in contact with fluid in an associated pumping chamber and whereby an outwardly directed face of each of said first and second piston means is in contact with fluid in an associated driving chamber, the area of each outwardly directed piston face in force transmitting contact with fluid in an associated driving chamber being substantially the entire radially extending cross sectional area of the piston means, the area of each inwardly directed piston face in force transmitting relationship with fluid in an associated pumping chamber being substantially the entire radially extending cross sectional area of the piston means less the cross sectional area of an associated piston shaft journal member, wherein the ratio of the radially extending cross sectional area of the piston to the journal member cross sectional area is at least 3 to 1;

(f) each said dry glycol pumping chamber being operatively associated with a pumping chamber inlet means in fluid communication with the treater apparatus for allowing an inflow of low pressure dry glycol and a pumping chamber outlet means in fluid communication with the absorber apparatus for allowing a discharge of high pressure dry glycol to the absorber apparatus, said pumping chamber inlet means comprising an inlet check valve means for allowing fluid flow into said pumping chamber through said inlet means and for preventing flow out of said pumping chamber through said inlet means, flow out of said pumping valve means for permitting fluid flow out of said pumping chamber through said outlet means and for preventing fluid flow into said pumping chamber through said outlet means;

(g) each said wet glycol driving chamber being operatively associated with a first and second reversible orifice means respectively, each reversible orifice means having an inflow operating position wherein an associated driving chamber is placed in fluid communication with wet glycol in said absorber apparatus for providing an inflow of wet glycol to said driving chamber and having an outflow operating position wherein an associated driving chamber is placed in fluid communication with the treater apparatus for allowing an exhaust of wet glycol from said driving chamber, the operating positions of said first and second reversible orifice means being opposite one another whereby when one driving chamber is receiving a wet glycol inflow, the other driving chamber is discharging wet glycol whereby said piston means and said piston shaft means is driven back and forth in a reciprocating motion;

(h) each said reversible orifice means comprising:
  (i) a wet glycol inlet fluid passage in fluid communication with said wet glycol in the absorber apparatus,
  (ii) a wet glycol outlet fluid passage in fluid communication with said wet glycol in the treater apparatus,
  (iii) a driving chamber fluid passage for allowing inflow or outflow of wet glycol therefrom, and
  (iv) main slide valve means slideable between an inflow position associated with said reversible orifice means inflow operating position wherein said wet glycol inlet fluid passage is placed in fluid communication with said driving chamber fluid passage, and an outflow position associated with said reversible orifice means outflow operating position wherein said wet glycol outlet fluid passage is placed in fluid communication with said driving chamber fluid passage;

(i) said main slide valve means comprising:
  (i) a slide valve body for changing the relative porting between the driving chamber fluid passage and said wet glycol inlet and outlet fluid passages, and
  (ii) a shifting assembly comprising a main slide valve piston shaft fixedly mounted at medial portions thereof with a first and second piston head said first piston head bearing on one lateral side of said slide valve body said second piston head bearing on the opposite lateral side of said slide valve body, said piston heads being slideably received within a slide valve cylinder and defining a first and second pressure chamber between respective outboard faces of each piston head and terminal end portions of said slide valve cylinder,
  iii) said main slide valve shifting assembly further comprising main slide valve actuation means including:
    (A) A first pilot line for alternately connection said first pressure chamber to high pressure wet glycol and low pressure wet glycol and
    (B) a second pilot line for alternately connecting said second pressure chamber to high pressure wet glycol and low pressure wet glycol,
    (C) said first and second pilot line being oppositely ported to a high pressure wet glycol source and a low pressure wet glycol source respectively by a pilot slide valve whereby when one of said first and second pressure chambers is connected to high pressure wet glycol, the other pressure chamber is connected to low pressure wet glycol, whereby the pressure differential between said pressure chambers causes relative shifting of said first and second piston heads and said main slide valve body to effect shifting of said main slide valve means between said first and second slide valve operation positions;
    (D) said pilot valve being relatively shiftable between a first and second operating position associated with said pilot line opposite porting configurations by displacement of a pivotal toggle having a first arm portion swivally connected to said pilot valve and having a second arm portion operatively engageable and deflectable by opposite medially positioned engagement portions on said elongate piston shaft when said piston shaft is at a relative position associated with an end portion of a piston stroke, the ratio of the length of said toggle second arm portion to said first arm portion being at least 2 to 1;

(j) whereby said pilot slide valve is shifted to change the porting of said pilot line whereby the pressure in said main slide valve chambers is reversed to produce relative shifting of said main slide valve body whereby the relative porting of high pressure wet glycol and low pressure wet glycol to said first and second drive chambers is reversed whereby the direction of motion of said main piston shaft and first and second main piston means is reversed whereby the relative direction of dry glycol inflow and dry glycol outflow from said first and second pumping chambers is reversed.

12. A fluid pumping system for use with a natual gas dehydrating system or the like having an absorber apparatus for removing water from wet natual gas to produce dry natural gas by use of a dessicant agent such as glycol, and a glycol treater apparatus for producing a source of dry glycol from wet glycol received from the absorber apparatus the system comprising:

a fluid pump means operatively connected between dry glycol source and absorber apparatus for pumping dry glycol from the dry glycol source to the absorber apparatus;

a fluid operable piston motor means operatively associated with said pump means for driving said pump means and having fluid inlet passage means for receiving wet glycol from said absorber and fluid outlet passage means for delivering wet glycol to said glycol reboiler means wherein energy derived from the flow of fluid passing through said fluid inlet passage means provides the entire motivating force for said motor means and said pump means; said fluid pump means comprising a first pair of equal diameter chamber portion of a double acting piston means having a piston rod with two oppositely positioned piston heads at terminal ends thereof received within two oppositely positioned cylinders mounted on a fixed central body which slidably supports said piston rod; said fluid operable motor means comprising a second pair of equal diameter chamber portions of said double acting piston means; the effective areas of outwardly directed faces of said piston heads being substantially greater than the effective areas of inwardly directed faces of said piston heads; and a wet glycol passage shifting means associated with said fluid motor means for automatically changing the porting of said fluid motor means at the end of a piston stroke for producing reciprocal piston motion in said fluid motor means including toggle means actuated by said piston rod.

13. The invention of claim 12 wherein said wet glycol passage shifting means comprises:
a main slide valve operatively associated with a wet glycol inlet port in fluid communication with said absorber apparatus and a wet glycol exhaust port operatively associated with said treater apparatus.

14. The invention of claim 13 said wet glycol passage shifting means further comprising:
pilot slide valve means operatively associated with said wet glycol inlet port and said wet glycol outlet port for producing an alternating pressure differential across said main slide valve for shifting said main slide valve between at least two operating positions.

15. The invention of claim 14 said wet glycol passage shifting means toggle means being centrally positioned relative said piston rod and being adapted for mechanically shifting said pilot slide valve means between at least two operating positions.

16. The invention as defined in claim 12 and wherein:
the effective area of said outwardly directed piston faces being between 5% and 50% greater than the effective areas of said inwardly directed piston faces.

* * * * *